United States Patent [19]
Czarnocki et al.

[11] Patent Number: 5,471,884
[45] Date of Patent: Dec. 5, 1995

[54] GAIN-ADJUSTING CIRCUITRY FOR COMBINING TWO SENSORS TO FORM A MEDIA ISOLATED DIFFERENTIAL PRESSURE SENSOR

[75] Inventors: Walter Czarnocki, Hoffman Estates; William Rathke, Arlington Heights, both of Ill.

[73] Assignee: Motorola, Inc., Schaumburg, Ill.

[21] Appl. No.: 270,552

[22] Filed: Jul. 5, 1994

[51] Int. Cl.[6] .............................. G01L 13/02; G01L 13/06
[52] U.S. Cl. ................... 73/720; 73/708; 73/719; 73/721
[58] Field of Search ................. 73/708, 716–721

[56] References Cited

U.S. PATENT DOCUMENTS

| | | |
|---|---|---|
| 4,131,088 | 12/1978 | Reddy ................................ 73/719 X |
| 4,196,382 | 4/1980 | Bryzek ................................ 73/726 X |
| 4,222,277 | 9/1980 | Kurtz et al. . |
| 4,287,501 | 9/1981 | Tominaga et al. ........................ 73/720 |
| 4,790,192 | 12/1988 | Knecht et al. . |
| 4,895,026 | 1/1990 | Tada . |
| 5,193,393 | 3/1993 | Czarnocki . |

FOREIGN PATENT DOCUMENTS 4227893   4/1993   Germany .

*Primary Examiner*—Richard Chilcot
*Assistant Examiner*—Joseph L. Felber
*Attorney, Agent, or Firm*—Nicholas C. Hopman

[57] ABSTRACT

A media-isolated differential pressure sensor apparatus and corresponding method combines a first signal (207, 209) provided by a first pressure sensor (101), indicative of a difference between a first pressure and second pressure applied across the first pressure sensor, and a second signal (213, 215) provided by a second pressure sensor, indicative of a difference between the second pressure and a third pressure applied across the second pressure sensor (103) to form a differential pressure sensor. Responsive to a pressure span the first signal (207, 209) responds with a slope response different than a slope response of the second signal (213, 215). A slope adjustment circuit (217) enables an adjustment of the slope response of the first signal (207, 209) to correspond to the slope response of the second signal (213, 215), and provides a slope adjusted first signal (221) dependent on the adjusted slope response. A difference circuit (225) provides an output signal (227) dependent on a difference between the slope adjusted first signal (221) and the second signal (223), where the output signal (227) is indicative of a pressure differential sensed between the first pressure sensor (101) and the second pressure sensor (103).

14 Claims, 1 Drawing Sheet

5,471,884

GAIN-ADJUSTING CIRCUITRY FOR COMBINING TWO SENSORS TO FORM A MEDIA ISOLATED DIFFERENTIAL PRESSURE SENSOR

FIELD OF THE INVENTION

This invention is generally directed to the field of pressure sensors, and specifically for media-isolated differential pressure sensors.

BACKGROUND OF THE INVENTION

In contemporary automotive systems it is often desirable to measure a pressure difference between two locations. For instance, it is desirable to measure a pressure difference across a sharp edge oriface in an EGR (exhaust gas reflow) system. Often, as in this case, the media can be very harsh. Because of this averse environment, isolation from the medium, here exhaust gas, is desirable to ensure that the sensor, typically semiconductor based, survives and functions properly over a long period of time.

Prior art approaches solved this challenge by using stainless steel diaphragms for sensing a pressure coupled by oil to a conventional semiconductor based pressure sensor. The stainless steel diaphragm provides the necessary isolation between the harsh media and the pressure sensor, and the oil provides the transfer of pressure to the pressure sensor. The oil medium used in this approach adds error to a pressure measurement because in the manufacturing process is difficult if not impractical to eliminate all air pockets. These air pockets add error to the pressure transfer between the stainless steel diaphragm sensing the media harsh pressure and the actual pressure sensor. Also, the oil pressure transfer performance is degraded with increasing temperature and time because of changes in oil viscosity and leakage of oil. Furthermore, using the oil filled approach is difficult to manufacture because the oil needs to be hermetically sealed between the stainless steel diaphragm and the pressure sensor.

What is needed is an improved media-isolated differential pressure sensor, that is more accurate, easier to manufacture, and has better field performance over time and temperature variations.

DETAILED DESCRIPTION OF THE PREFERRED EMBODIMENT

A media-isolated differential pressure sensor apparatus and corresponding method combines a first signal provided by a first pressure sensor, indicative of a difference between a first pressure and second pressure applied across the first pressure sensor, and a second signal provided by a second pressure sensor, indicative of a difference between the second pressure and a third pressure applied across the second pressure sensor, to form a differential pressure sensor. Responsive to a pressure span, or a range of pressures, the first signal has a slope response different than a slope response of the second. signal. A slope adjustment circuit enables an adjustment of the slope response of the first signal to correspond to the slope response of the second signal, and provides a slope adjusted first signal dependent on the adjusted slope response. A difference circuit provides an output signal dependent on a difference between the slope adjusted first signal and the second signal, where the output signal is indicative of a pressure differential sensed between the first pressure sensor and the second pressure sensor.

Features of the present invention include providing a structure that enables the combining of two pressure sensors to form a differential pressure sensor that has its critical elements isolated from harsh media. Furthermore, the structure enables parallel compensation of span and offset errors associated with each sensor. Given this teaching this structure can be easily expanded to include more than two sensors. These and other benefits of the present invention will be better appreciated with a review of the accompanying figures.

Figure 1:
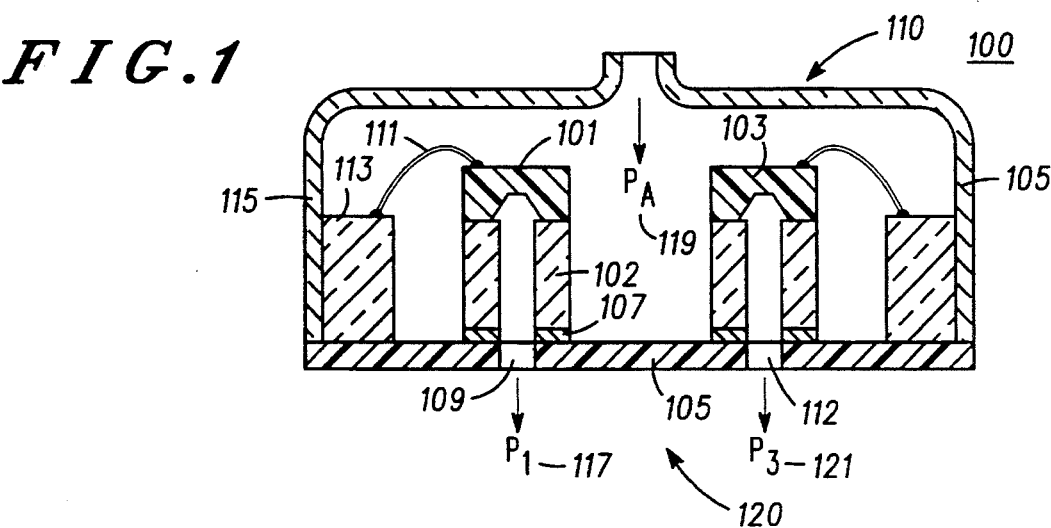
FIG. 1 is a schematic diagram of a first and second pressure sensor both mounted on a common assembly, in accordance with a preferred embodiment of the invention.

FIG. 1 is a schematic diagram of a first and second pressure sensor both mounted on a common assembly. A first pressure sensor 101 and second pressure sensor 103 are both hard mounted in a common sensor assembly 100. Preferably, these pressure sensors 101 and 103 are constructed of silicon and are of the piezoresistive type. The first pressure sensor 101 is electrostatically bonded to a glass pedestal 102. The glass pedestal 102 is bonded to an alumina ceramic substrate 105 using a hard-mount technique, such as soldering, or alternatively using an adhesive 107. A bond wire 111 electrically connects the sensor 101 to a main substrate 113. Note that there are actually several bond wires but one is shown for clarity. The second pressure sensor 103 has a construction corresponding to the construction of the first pressure sensor 101.

The above-described structure is encapsulated in a housing 115. Reference number 110 indicates an unprotected side of the sensor assembly 100, and reference number 120 indicates a protected, or media-isolated side of the sensor assembly 100. The unprotected side 110 is considered unprotected because if the harsh media present on the protected side 120 was exposed to the bond wire 111 it would chemically attack it and the bond wire would rapidly deteriorate and fail. The protected side 120 of the sensor assembly is considered protected because of the mostly hermetic seal resulting from the bonding of the elements 101, 102, 105, and 107. The unprotected side 110 of the both pressure sensors is not exposed to the harsh media.

A first pressure P1 117, is applied to pressure port 109 on the protected side 120 of the first pressure sensor 101. A second, typically ambient, pressure Pa 119, is provided on the unprotected side 110 of the sensor assembly and is common to both the first and second pressure sensors 101 and 103. A third pressure P3 121, is applied to pressure port 112 on the protected side 120 of the second pressure sensor 103. Next, an electrical circuit used to combine outputs from the two pressure sensors 101 and 103 is detailed in FIG. 2.

Figure 2:
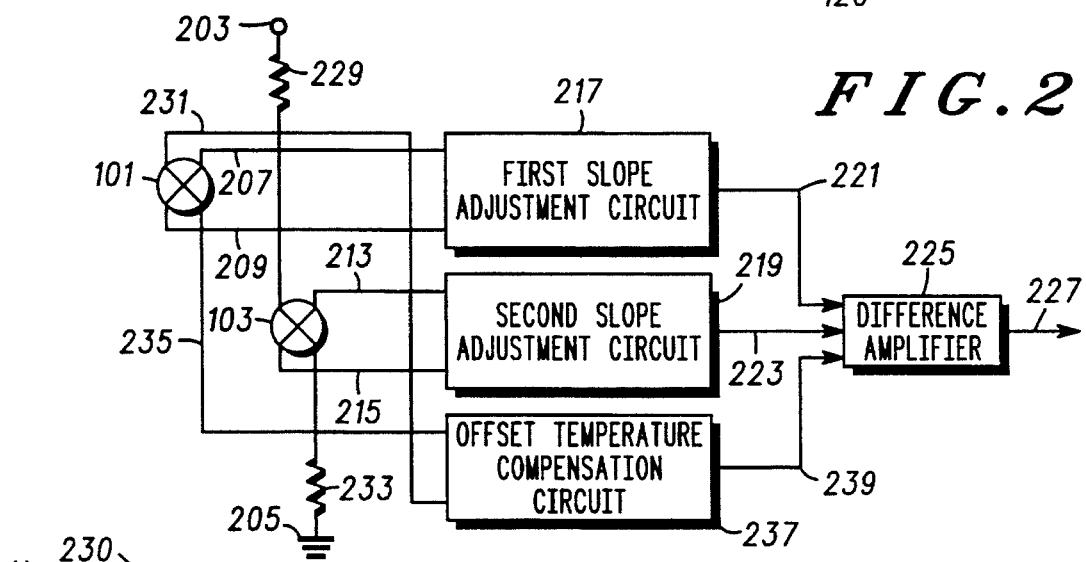
FIG. 2 is a system block diagram illustrating a structural relationship used to convert signals provided by the pressure sensors shown in FIG. 1 to form a differential pressure sensor.

FIG. 2 is a system block diagram illustrating a structural relationship used to convert signals provided by the pressure sensors 101 and 103 shown in FIG. 1 to form a differential pressure sensor that provides an output signal 227 whose response will be dependent on a difference between the first pressure P1 111 and the third pressure P3 121 and independent of the second pressure Pa 119. Note that circuitry representing the structure shown in FIG. 2 is shown in FIG.

3 and is physically located on the main substrate 113.

As pressure P1 117 and Pa 119 are applied to the sensor assembly 100, the first pressure sensor 101 outputs a first signal 207, 209 indicative of a difference between the first pressure P1 117 and the second pressure Pa 119 applied across the first pressure sensor 101. The second pressure sensor 103 provides a second signal 213, 215 indicative of a difference between the second pressure Pa 119 and the third pressure P3 121 applied across the second pressure sensor 103. Ordinarily these two signals 207, 209 and 213, 215 have different slopes over a pressure span because the present state of the art manufacturing processes do not allow the manufacture of sensors that have perfectly the same slopes. Thus over a range of pressure the first signal 207, 209 responds with a slope and over the same range of pressure the second signal 213, 215 provided by the second pressure sensor 103 responds with a slope different than the slope provided by the first pressure sensor 101. An important step in synthesizing the output signal 227 is the matching of the slope response of the two signals 207, 209 and 213, 215 provided by the two pressure sensors 101, 103.

A slope adjustment circuit 217 conditions the first pressure sensor signal 207, 209 and provides a slope adjusted first signal 221. Another slope adjustment circuit 219 conditions the second pressure sensor signal 213, 215 and provides a slope adjusted second signal 223. In a minimal implementation only the first slope adjustment circuit 217 is necessary because the slope of the first pressure sensor signal 207, 209 needs to be adjusted to the slope of the second pressure sensor signal 213, 215, so the second pressure sensor signal 213, 215 slope can be fixed. In this case the slope response of the slope adjusted first signal 221 is adjusted to correspond to the slope response of the second pressure sensor signal 213, 215. In this embodiment the slope of the second pressure sensor signal 213, 215 is first adjusted and a slope adjusted second signal 223 is provided from the slope adjustment circuit 219. Then the first slope adjustment circuit 217 provides the slope adjusted first signal 221 after the adjustment of the slope of the first pressure sensor signal 207, 209.

Next the slope adjusted first signal 221 is subtracted from the slope adjusted signal 223 by a difference amplifier 225. To understand the relevant aspects of combining the slope adjusted first signal 221 and the slope adjusted second signal 223, a brief review of equations determining the combination will be reviewed as follows.

The response of the slope adjusted first signal 221 can be expressed using the following equation.

EQUATION 1

$$S1 = \text{Offset1} + m1(P1-Pa)$$

Where Offset 1 is a pressure independent (constant) term of the slope adjusted first signal 221 derived from the first pressure sensor 101, and m1 is a pressure slope of the slope adjusted first signal 221 derived from the first pressure sensor 101. P1–Pa is a differential pressure applied across the first pressure sensor 101 with P1 111 applied from the protected side 120 and Pa 119 applied from the unprotected side 110.

The response of the slope adjusted second signal 223 is described using the following equation.

EQUATION 2

$$S2 = \text{Offset2} + m2(P3-Pa)$$

Where Offset2 is a pressure independent (constant) term of the slope adjusted second signal 223 derived from the second pressure sensor 103, and m2 is a pressure slope of the slope adjusted second signal 223 derived from the second pressure sensor 103. P3–Pa is a differential pressure applied across the second pressure sensor 103 with P3 121 applied from the protected side 120 and Pa 119 applied from the unprotected side 110.

If an adjustment is made in such a way that m1=m2=m, then the subtraction done by the difference amplifier 225 of the slope adjusted first signal 221 from the slope adjusted second signal 223 will produce resultant signal S2–S1 that is dependent on the difference of third pressure P3 121 and first pressure P1 111. In addition, signal S2–S1 is completely independent to the second pressure Pa 119 which is common to the first pressure sensor 101 and second pressure sensor 103. Thus a differential pressure sensor that responds to the protected side 120 pressures only is created. This deterministic result can be expressed in the following equation.

EQUATION 3

$$S2-S1 = (\text{Offset2}-\text{Offset1}) + m(P3-P1) + m(Pa-Pa)$$

As is indicated above the difference amplifier 225, provides necessary subtraction, of the slope adjusted first signal 221 and the slope adjusted second signal 223. In addition, the difference amplifier 225 is coupled to an offset-temperature-compensation circuit 237 which allows temperature compensation of the offset term of both pressure sensors 101 and 103 at the same time. Furthermore, the difference amplifier 225 possesses means for adjustment of the total circuit gain and offset at a reference temperature.

An additional component of the block diagram shown in FIG. 2 is a span-temperature compensation circuit comprising a network 229 coupled to each of the first and second pressure sensors 101, 103, and one side of a power supply signal 203, and a network 233 coupled to each of the first and second pressure sensors 101, 103, and another side of the power supply signal shown at reference number 205. The span-temperature compensation circuit 203, 229, 233, and 205 provides span-temperature compensation for the first and second pressure sensors 101, 103 at the same time. Signals present at reference numbers 231 and 235 derived from the span-temperature compensation circuit 203, 229, 233, and 205 are provided to the offset-temperature-compensation circuit 237 which in turn provides an offset-span-temperature-compensation signal 239.

Figure 3:
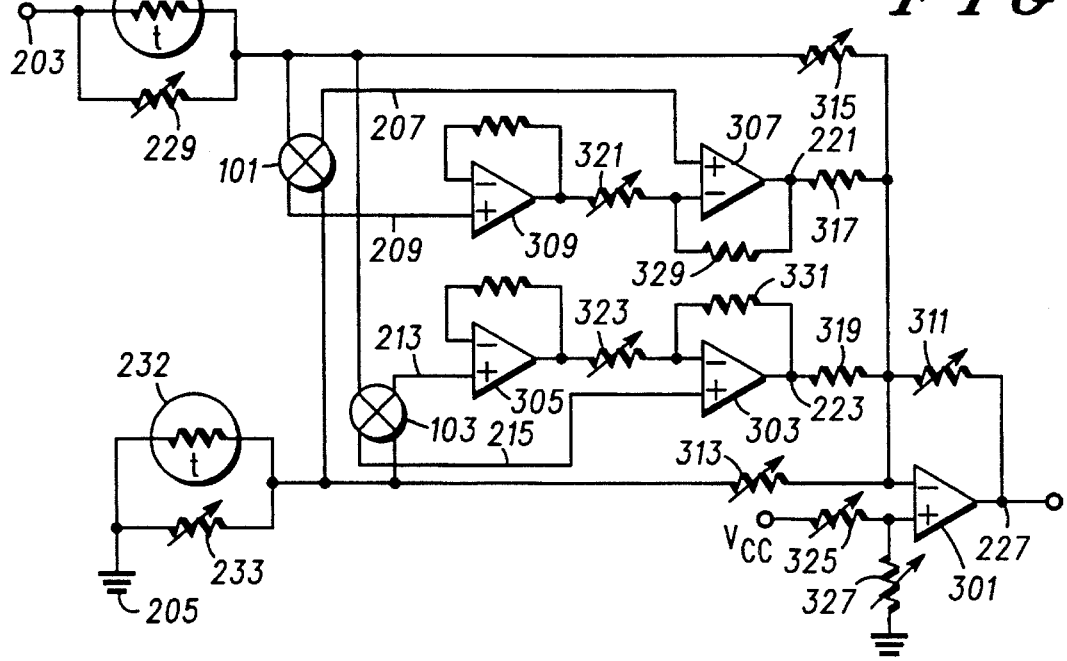
FIG. 3 is a schematic diagram illustrating details of the system block diagram introduced in FIG. 2.

FIG. 3 is a schematic diagram illustrating details of the system block diagram introduced in FIG. 2. Referring to FIG. 3 the span-temperature compensation circuit introduced in FIG. 2 is repeated here and includes elements 203, 229, 233, and 205. Additionally, thermistor elements 230 and 232 are part of the networks 229 and 233. The first adjustment will be to trim resistors in the networks 229, 233 to set a correct temperature coefficient of this network for span-temperature compensation. Here networks 229 and 233 are shown as variable resistors. In the preferred embodiment these networks 229 and 233 are fixed resistive ink resistors printed on a thick film network. Adjustment is achieved by laser trimming.

The next step is to adjust the slopes of the signals 221 and 223 to be the same. The slope adjusted first signal 221 is an output of the differential pair composed of operational amplifiers 307, 309 and gain determining resistors 329, 321 which produces a positive differential voltage from the output voltage 207, 209 of the first pressure sensor 101. The slope adjusted second signal 223 is an output of the differential pair composed of operational amplifiers 303, 305 and gain determining resistors 323, 331 which produces a negative differential voltage from the output voltage 213, 215 of the second pressure sensor 103. These two signals 221 and 223 are then summed together using an operational amplifier 301 and equal input resistors 317 and 319. Thus summation of the positive differential voltage and negative differential voltage creates the virtual subtraction of the signal from the first pressure sensor 101 from signal from the second pressure sensor 103. The slope of either voltage 221 or 223 can be adjusted but only one has to be actually trimmed to match the other slope. Thus, for example, the slope of the slope adjusted first signal 221 can be adjusted by trimming resistor 321 or the slope of the voltage 223 can be adjusted by trimming resistor 323. As was mentioned before resistors 317 and 319 have to equal for perfect subtraction of the voltages 221 and 223.

After the slope adjustment step the circuit gain is trimmed using resistor 311. Circuit offset is increased by trimming resistor 327 and decreased by trimming resistor 325. Finally, the entire sensor assembly 100 is exposed to two different temperatures to determine temperature drift of offset. Measured temperature drift of the offset voltage is then trimmed using either resistor 315 or 313 depending on the direction of the drift. In conclusion, an improved media-isolated differential pressure sensor, that is more accurate, easier to manufacture, and has better. field performance over time and temperature variations has been detailed. It overcomes the deficiencies of prior art approaches by replacing the media isolation technique of a stainless steel diaphragm and oil with an electrostatically bonded semiconductor structure. Furthermore, a simplified approach for calibrating multiple sensors and combining their outputs to electronically form a differential signal provides a substantial manufacturability and field performance advantage.

What is claimed is:

1. A media-isolated differential pressure sensor apparatus for combining a first signal provided by a first pressure sensor, indicative of a difference between a first pressure and second pressure applied across the first pressure sensor, and a second signal provided by a second pressure sensor, indicative of a difference between the second pressure and a third pressure applied across the second pressure sensor, wherein responsive to a pressure span the first signal responds with a slope response different than a slope response of the second signal, the apparatus comprising:

means for adjusting the slope response of the first signal to correspond to the slope response of the second signal, and providing a slope adjusted first signal dependent on the adjusted slope response; and means for providing an output signal dependent on a difference between the slope adjusted first signal and the second signal.

2. An apparatus in accordance with claim 1 further comprising an offset means for providing an offset signal, and wherein the means for providing an output signal provides the output signal dependent on the offset signal.

3. An apparatus in accordance with claim 1 further comprising:

an offset-temperature and span-temperature compensation circuit coupled to each of the first and second pressure sensors for providing an offset-span-temperature-compensation signal derived from the first, second pressure sensors; and wherein the means for providing an output signal provides the output signal dependent on the offset-span-temperature-compensation signal and a difference between the slope adjusted first signal and the second signal.

4. An apparatus in accordance with claim 1 wherein the means for adjusting decreases the slope response of the first signal to correspond to the slope response of the second signal.

5. An apparatus in accordance with claim 1 wherein the first pressure sensor is a piezo-resistive device.

6. A media-isolated differential pressure sensor apparatus for combining a first signal provided by a first pressure sensor, indicative of a difference between a first pressure and second pressure applied across the first pressure sensor, and a second signal provided by a second pressure sensor, indicative of a difference between the second pressure and a third pressure applied across the second pressure sensor, wherein responsive to a pressure span the first signal responds with a slope response different than a slope response of the second signal, the apparatus comprising:

a slope adjustment circuit for adjusting the slope response of the first signal to correspond to the slope response of the second signal, and providing a slope adjusted first signal dependent on the adjusted slope response;

an offset-temperature and span-temperature compensation circuit coupled to each of the first and second pressure sensors, the circuit for providing an offset-span-temperature-compensation signal derived from the first and second pressure sensors; and a difference amplifier for providing an output signal dependent on the offset-span-temperature-compensation signal and a difference between the slope adjusted first signal and the second signal.

7. An apparatus in accordance with claim 6 wherein the slope adjustment circuit decreases the slope response of the first signal to correspond to the slope response of the second signal.

8. An apparatus in accordance with claim 7 wherein the first pressure sensor is a piezo-resistive device.

9. A media-isolated differential pressure sensor apparatus comprising:

a first pressure sensor for providing a first signal indicative of a first pressure, wherein responsive to a pressure span the first signal responds with a first slope;

a second pressure sensor for providing a second signal indicative of a second pressure, wherein responsive to the pressure span the second signal responds with a slope different than the first slope;

a slope adjustment circuit for adjusting the slope response of the first signal to correspond to the slope response of the second signal, and providing a slope adjusted first signal dependent on the adjusted slope response;

an offset-temperature and span-temperature compensation circuit coupled to each of the first and second pressure sensors, the circuit for providing an offset-span-temperature-compensation signal derived from the first and second pressure sensors; and a difference amplifier for providing an output signal dependent on the offset-span-temperature-compensation signal and a difference between the slope adjusted first signal and the second signal.

10. A media-isolated differential pressure sensing method for combining a first signal provided by a first pressure sensor, indicative of a difference between a first pressure and a second pressure applied across the first pressure sensor, and a second signal provided by a second pressure sensor, indicative of a difference between the second pressure and a third pressure applied across the second pressure sensor, wherein responsive to a pressure span the first signal responds with a slope response different than a slope response of the second signal, the method comprising the steps of:

adjusting the slope response of the first signal to correspond to the slope response of the second signal, and providing a slope adjusted first signal dependent on the adjusted slope response; and providing an output signal dependent on a difference between the slope adjusted first signal and the second signal.

11. A method in accordance with claim 10 further comprising the step of:

providing an offset signal; and wherein the step of providing an output signal provides the output signal dependent on the offset signal.

12. A method in accordance with claim 11 further comprising the step of:

providing offset-temperature and offset-span-temperature-compensation signals derived from the first and second pressure sensors; and wherein the step of providing an output signal provides the output signal dependent on the offset-temperature and offset-span-temperature-compensation signals and a difference between the slope adjusted first signal and the second signal.

13. A method in accordance with claim 12 wherein the step of adjusting decreases the slope response of the first signal to correspond to the slope response of the second signal.

14. A method in accordance with claim 12 wherein the step of adjusting comprises a step of laser trimming.

* * * * *